Jan. 12, 1965 A. W. ZEITER 3,165,186
VENDING MACHINES FOR VENDING HOT FOOD
Filed Oct. 9, 1961 5 Sheets-Sheet 1

INVENTOR.
ANTHONY W. ZEITER
BY
Alfred W. Petchaft
ATTORNEY

INVENTOR.
ANTHONY W. ZEITER
BY
*Alfred W. Petchaft*
ATTORNEY

INVENTOR.
ANTHONY W. ZEITER

BY

ATTORNEY

*INVENTOR.*
ANTHONY W. ZEITER
BY
ATTORNEY

Jan. 12, 1965     A. W. ZEITER     3,165,186
VENDING MACHINES FOR VENDING HOT FOOD
Filed Oct. 9, 1961     5 Sheets-Sheet 5
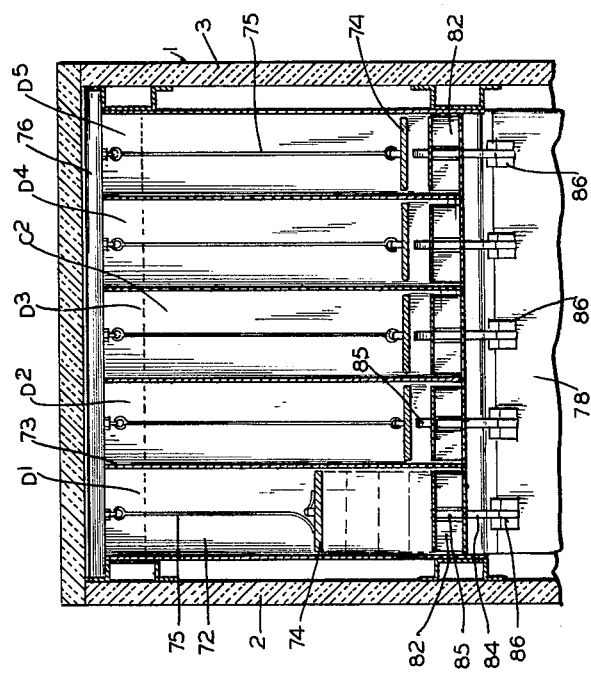
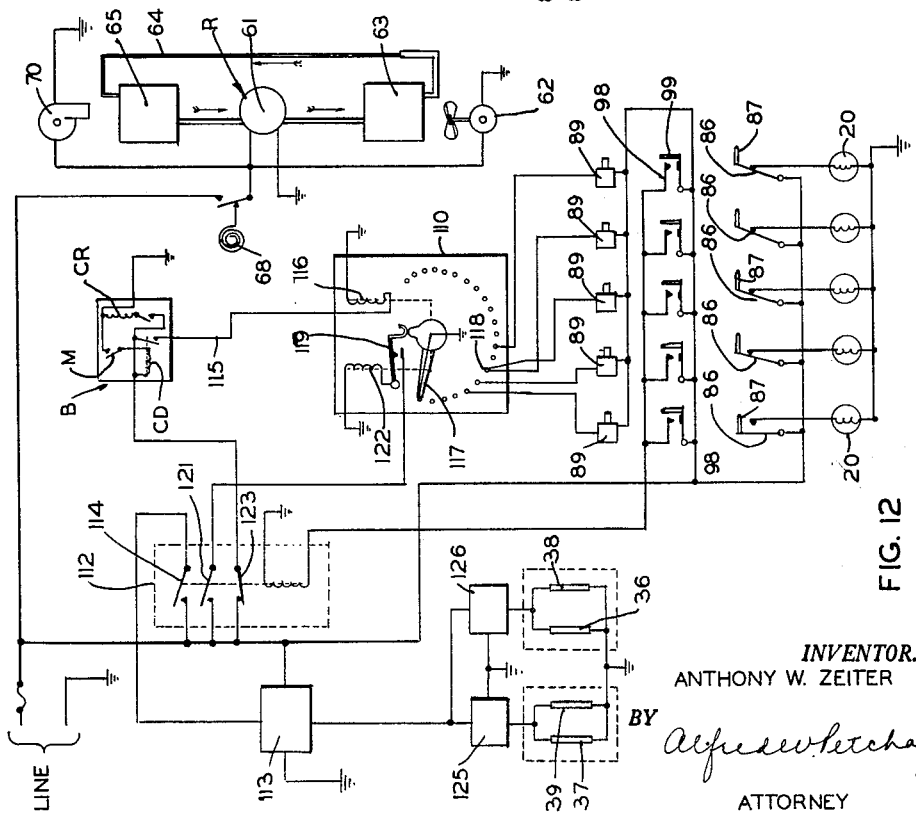
*INVENTOR.*
ANTHONY W. ZEITER
BY
ATTORNEY

United States Patent Office 3,165,186
Patented Jan. 12, 1965

3,165,186
VENDING MACHINES FOR VENDING HOT FOOD
Anthony W. Zeiter, 3115 Rock Crest Drive,
Mehlville, Mo.
Filed Oct. 9, 1961, Ser. No. 143,848
10 Claims. (Cl. 194—2)

This invention relates in general to certain new and useful improvements in vending machines and, more particularly, to a vending machine for vending hot food.

At the present time, there is a great need, in bus terminals, airports, railway stations, subway stations, industrial plants, and business offices in outlying areas for some type of automatic hot food service. People who happen to be in such locations encounter considerable difficulty in obtaining food for lunch hours and, consequently, are inconvenienced by having to do without food temporarily or are required to eat cold, unappetizing and haphazardly prepared sandwiches, with the result that the workers do not obtain proper or satisfactory nourishment.

Some efforts have been made to supply sandwiches through vending machines, but, thus far, no particularly satisfactory vending machine has been developed which will supply a reasonable variety of different kinds of sandwiches and maintain them in a vermin-proof refrigerated unit. In addition to this, available types of sandwich vending machines are incapable of vending a hot sandwich.

It is, therefore, the primary object of the present invention to provide a sandwich vending machine which is capable of storing and ultimately dispensing a substantial number of different types of edible articles so as to afford the purchaser a reasonable variety to choose from.

It is also an object of the present invention to provide a sandwich vending machine of the type stated which is capable of maintaining food under refrigerated conditions.

It is a further object of the present invention to provide a sandwich vending machine which is capable of delivering food and has additional means which may optionally be employed by the vendee for the purpose of heating the food which has been delivered.

It is an additional object of the present invention to provide a sandwich vending machine of the type stated which is capable of vending food in a sanitary protective container.

With the above and other objects in view, my invention resides in the novel features of form, construction, arrangement, and combination of parts presently described and pointed out in the claims.

In the accompanying drawings (five sheets)—

Figure 3:
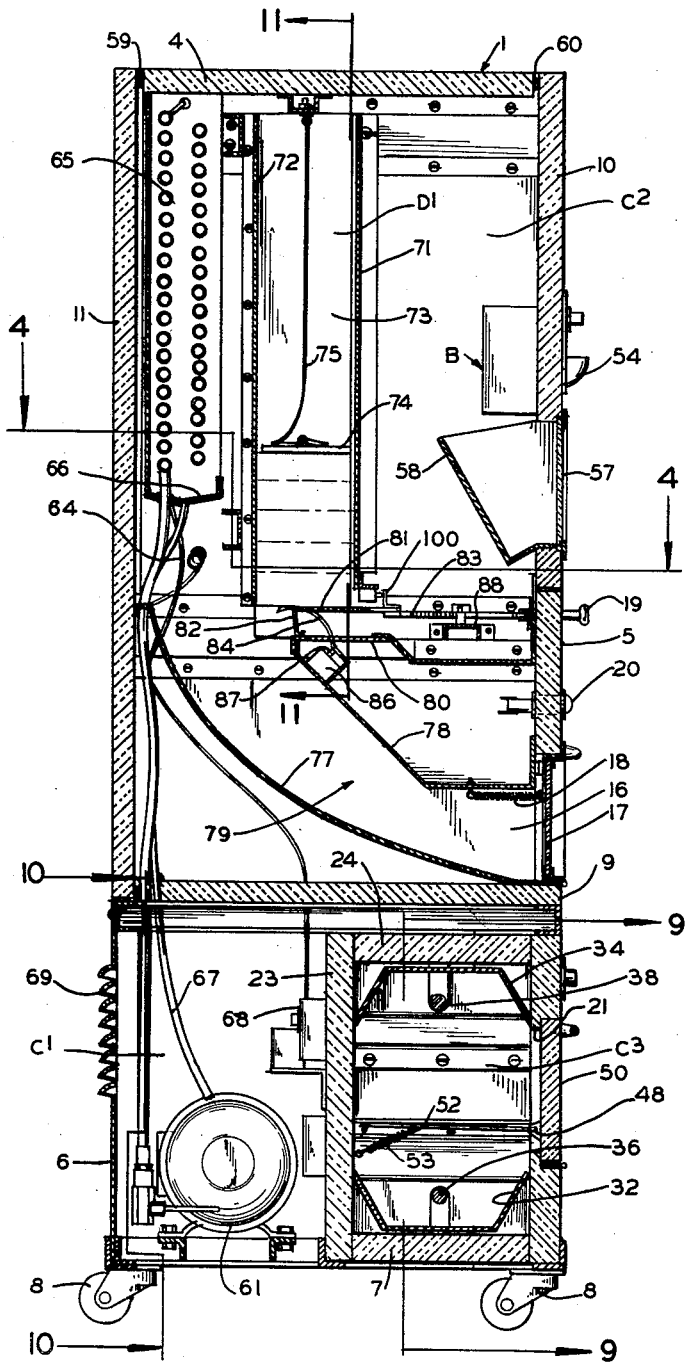
FIG. 3 is a vertical sectional view taken along line 3—3 of FIG. 1.
Figure 5:
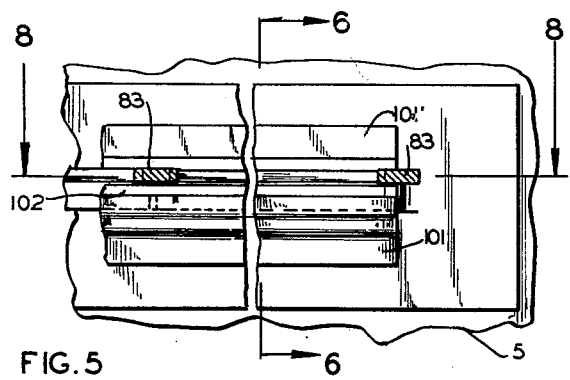
FIG. 5 is a fragmentary sectional view taken along line 5—5 of FIG. 4.
Figure 6:
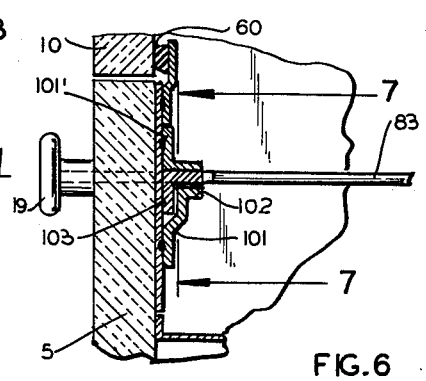
FIG. 6 is a fragmentary sectional view taken along line 6—6 of FIG. 5.
Figure 7:
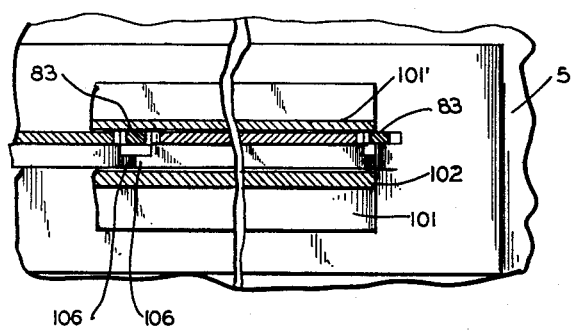
FIG. 7 is a fragmentary sectional view taken along line 7—7 of FIG. 6.
Figure 9:
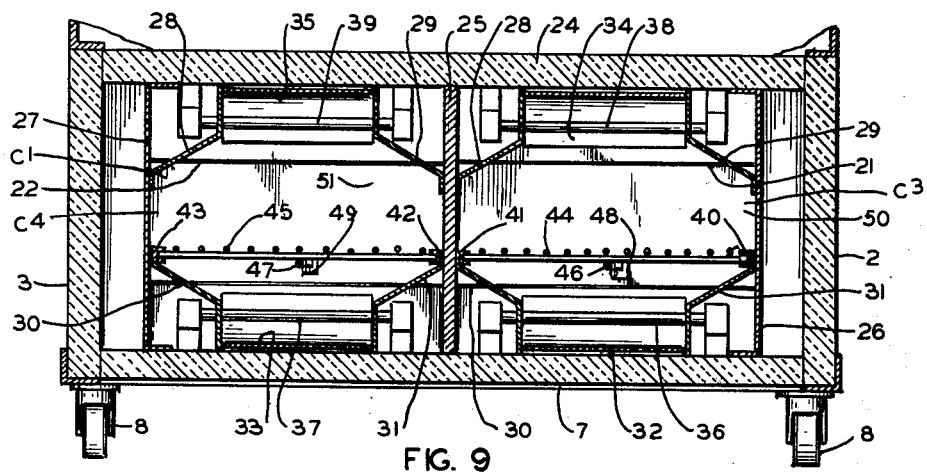
Figure 10:
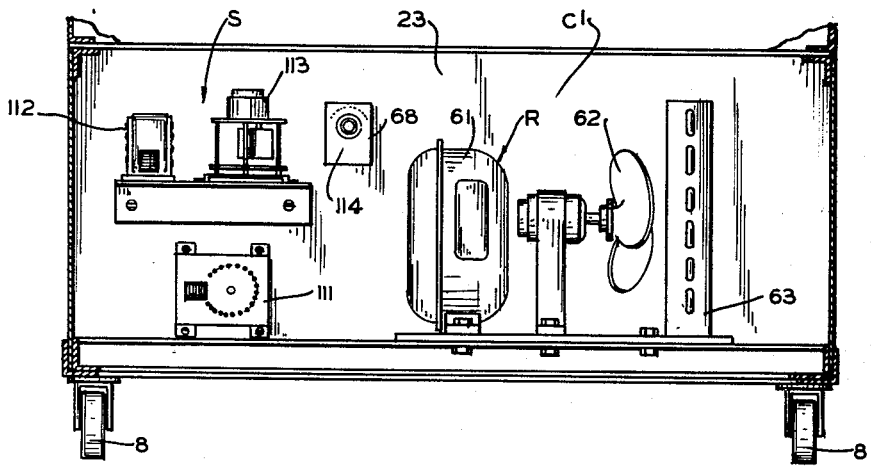

FIGS. 9, 10, and 11 are fragmentary sectional views taken along lines 9—9, 10—10, and 11—11, respectively, of FIG. 3; and FIG. 12 is a schematic wiring diagram showing the electrical circuitry forming a part of the present invention.

Referring now in more detail and by reference characters to the drawings, which illustrate a practical embodiment of the present invention, A designates a vending machine comprising a rectilinear shell or casing 1 constructed of heat-insulative material and consisting of side walls 2, 3, top wall 4, front wall 5, rear wall 6, and a bottom wall 7, which is, in turn, preferably mounted at its corners upon four casters 8. The front wall 5 and rear wall 6 are relatively short and extend up from the bottom wall approximately one-third of the total height of the vending machine A and are cross-connected by a heat-insulative horizontal partition 9 which sub-divides the vending machine into a lower compartment $c^1$ and an upper compartment $c^2$, the latter opening both to the front and to the rear and being closed by doors 10, 11, respectively mounted on the side wall 3 by piano-type hinges 12, 13. The doors 10, 11, are normally held in closed position by means of conventional locks 14, 15.

The front wall 5 is provided, in the upper portion of its area above the partition 9, with a horizontally elongated discharge opening 16 which is conventionally closed by a hinged transparent closure flap 17 biased into closed position by springs 18. Slidably mounted in and extending through the upper portion of the front wall 5 is a horizontally aligned uniformly spaced series of pull-handles 19, all of which are identical and operate identical ejector mechanisms which will presently be described in more full detail. Also mounted in the upper portion of the front wall 5 directly below each pull-handle 19 is a signal light 20 which, when lit, will read "Empty."

In the area below the partition 9, the front wall 5 is provided with two door openings 21, 22, which open interiorly to oven compartments $c^3$, $c^4$, formed by a vertical rear wall 23 extending upwardly from the bottom wall 7 and horizontally between the side walls 2, 3. At its upper margin the rear wall 23 is connected to the rear margin of a horizontal top wall 24, the latter being suitably connected at its forward margin to the rear face of the front wall 5. The oven compartments $c^3$, $c^4$, are separated from each other by a vertical median-wall 25 which is also fabricated from some suitable heat-insulative material. Also mounted in and extending across the oven compartments $c^3$, $c^4$, in inwardly spaced relation to the side walls 2, 3, respectively, are vertical partitions 26, 27, which support angularly bent upper and lower sets of reflective baffles 28, 29, 30, 31, each of which is rectangularly deformed to provide a horizontal pocket for receiving and supporting heat-ray reflectors 32, 33, 34, 35. Conventionally mounted within the oven compartments $c^3$, $c^4$, and extending across the spaces defined by the pocketed reflectors 32, 33, 34, 35, are horizontal infra-red tubes 36, 37, 38, 39, which are electrically connected to a source of electrical current through a switching mechanism, generally designated by the reference character S, mounted upon the rearwardly presented face of the rear wall 23, all as best seen in FIGS. 3 and 9.

Rigidly mounted within the oven compartments $c^3$, $c^4$, and extending horizontally thereacross from front to rear are pairs of opposed slide-channels 40, 41, 42, 43, which slidably support welded wire grills 44, 45, which are, in turn, respectively provided with forwardly extending pivoted pull bars 46, 47, rockably connected at their forward ends to ears 48, 49, which are respectively mounted upon the inwardly presented faces of flat-type doors 50, 51, which are hingedly mounted upon the front wall 5 for closurewise disposition within and across the door openings 21, 22, respectively. Intermediate their ends the pull bars 46, 47, are provided with downwardly presented eyes 52 for hooked engagement in one end of a tension spring 53 which is, in turn, hooked at its other end to the rear wall 23 so as to bias the grills 44, 45, and doors 50, 51, inwardly into closed position.

The front door 10 is provided with a coin-return chute 54, a coin deposit slot 55 having the conventional coin-return button 56, and suitably mounted in the door 10 at approximately mid-height is a horizontally elongated display window 57 opening interiorly upon an open-topped display rack 58, which is adapted to receive any suitable type of display for the various foods or sandwiches within the vending machine A. Mounted on the inside face of the door 10 is a conventional coin-receiving and slug-rejecting mechanism B having a money-switch $m$ of the incremental pulsing type, a coin-depositing solenoid CD and a coin-returning solenoid CR, all of which are entirely conventional and are, therefore, not described herein in detail.

As above noted, the partition 9, formed of insulating material so as to form a heat barrier between the compartments $c^1$, $c^2$, extends rearwardly to the plane of the rear door 11 which is sealed by a peripheral gasket-like ring 59 formed of rubber or other similar material. Similarly, the front door 10 is sealed by a ring 60 also formed of rubber or other similar material. The purpose of the partition 9 and the sealed doors 10, 11, is to make it possible to refrigerate the compartment $c^2$.

Figure 1:
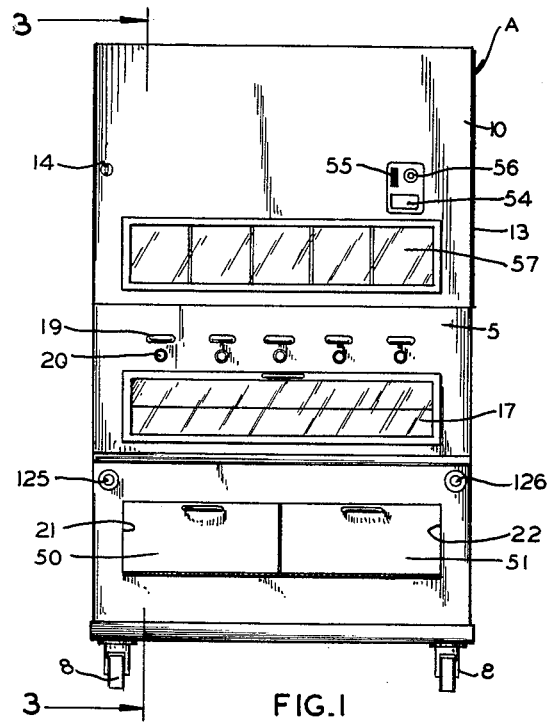
FIG. 1 is a front elevational view of a sandwich vending machine constructed in accordance with and embodying the present invention.
Figure 2:
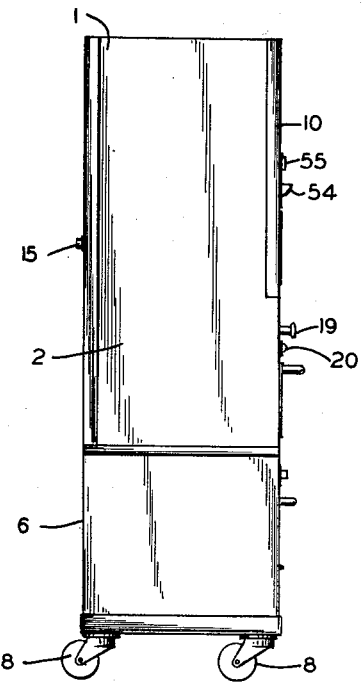
FIG. 2 is a side elevational view of the sandwich vending machine.
Figure 4:
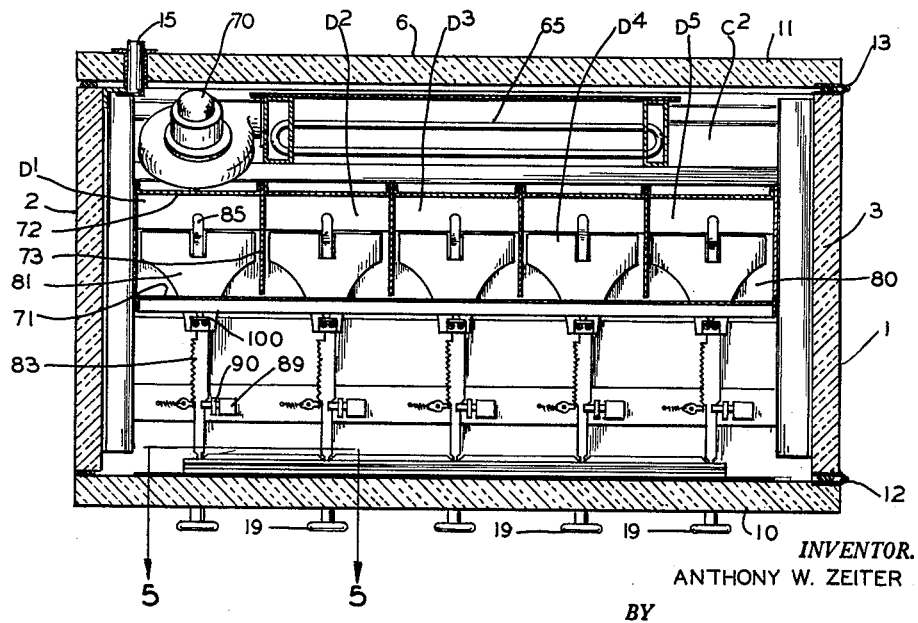
FIG. 4 is a horizontal sectional view taken along line 4—4 of FIG. 3.

Conventionally mounted within the lower compartment $c^2$ is an electrically driven refrigeration unit R comprising a conventional compressor 61, air-circulating fan 62, and condenser 63, which are operatively connected in the usual manner and supply refrigerant, through a high-pressure line 64 to an evaporator-coil 65 located in the rear of the compartment $c^2$. The coil 65 is also provided with a gutter 66 for catching condensate and re-returning it through a condensate line 67 to the outer surfaces of the condenser 63 for dissipation by evaporation. Operatively associated with the evaporator-coil 65 is a thermostatic control 68 which controls the cycling of the compressor to maintain a predetermined temperature within the compartment $c^2$. It will, of course, be understood that the evaporator-coil 65, condenser 63, and compressor 61 perform the usual functions of a refrigerative unit and, therefore, need not be described in detail, since any type of common or available refrigeration may be employed for cooling the compartment $c^2$. In this connection, it should be noted also that the rear wall 6 is provided with a ventilation grill 69 to permit circulation of cooling air around the condenser 63. It will also be noted by reference to FIG. 4 that a conventional blower 70 is mounted in the compartment $c^2$ to circulate air around the evaporator-coil 65.

Mounted in, and extending horizontally across, the compartment $c^2$ is a plurality of vertical merchandise storage chutes $D^1$, $D^2$, $D^3$, $D^4$, $D^5$, which are all of substantially identical shape and construction. Since the storage chutes $D^1$, $D^2$, $D^3$, $D^4$, $D^5$, are all of substantially identical construction, it will only be necessary herein to describe one of them.

The storage chute $D^1$ is defined by spaced parallel front and rear walls 71, 72, connected by a vertical transverse partition 73 which sub-divides the space between the walls 71, 72, into the five storage chutes $D^1$, $D^2$, $D^3$, $D^4$, $D^5$. The storage chute $D^1$ is sized for containing a stack of boxed food packages P, which are urged downwardly within the chute $D^1$ by means of a top-weight 74 loosely suspended from a slack chord 75 which is fastened at its upper end to a cross-bar 76 mounted on the underface of the top wall 4, all as best seen in FIG. 3.

The chute $D^1$, as well as all the other chutes $D^2$, $D^3$, $D^4$, $D^5$, open downwardly toward a relatively large downwardly and forwardly sweeping discharge-apron 77 which is mounted in and extends more or less horizontally across the lower portion of the compartment $c^2$ and terminates at its lower end in proximity to the transparent hinged-flap 17, so that whenever a food package P is discharged onto the discharge-apron 77 it will slide down into conveniently accessible position, so that the purchaser may pull the transparent flap 17 outwardly and reach the delivered merchandise package P for manual removal from the vending machine A.

Also mounted in and extending horizontally across the lower portion of the chamber $c^2$ in upwardly and forwardly spaced relation to the discharge apron 77 is a forward wall 78 formed of sheet metal and having a shape which is approximately similar to the contour of the discharge apron 77 so as to define a discharge chute 79. Extending forwardly from the upper horizontal margin of the forward wall 78 is a horizontal plate 80 which slidably supports a series of identical discharge shoes 81 which extend horizontally beneath the lower open end of each of the storage chutes $D^1$, $D^2$, $D^3$, $D^4$, $D^5$, and at their rear margins are bent downwardly in the provision of substantially vertical pusher-flanges 82. The distance between the plate 80 and the plane of movement of the discharge shoe 81 is substantially equal to the vertical height of one of the food packages P and, similarly, the vertical height of the flange 82 is also equal to the vertical height of a food package P, all as best seen in FIG. 3.

Each of the discharge shoes 81 extends forwardly beyond the front wall 71 and is attached to a flat horizontal actuating bar 83 which is, in turn, rigidly connected at its forward end to a pull-handle 19. It will, of course, be understood that one discharge shoe 81, bar 83, and pull-handle 19 are operatively associated with each one of the discharge chutes $D^1$, $D^2$, $D^3$, $D^4$, $D^5$. Moreover, each discharge shoe 81 and its associated pusher-flange 82 is provided with a medial slot 84 which affords operative clearance for an elongated and somewhat arcuate actuating blade 85 operatively mounted on and forming an extension of a limit switch 86 which has a reciprocating switch plunger 87 mounted beneath and actuated by the blade 85. As long as food packages P are in the discharge chute $D^1$ the particular switch 87 which is associated with such discharge chute $D^1$ will be held open. If, however, the chute is empty, as is the case with discharge chutes $D^2$, $D^3$, $D^4$, $D^5$, as shown in FIG. 11, the switches 87 which are associated with such discharge chutes will be closed and circuits will be completed to the "Empty" lights 20.

Figure 8:
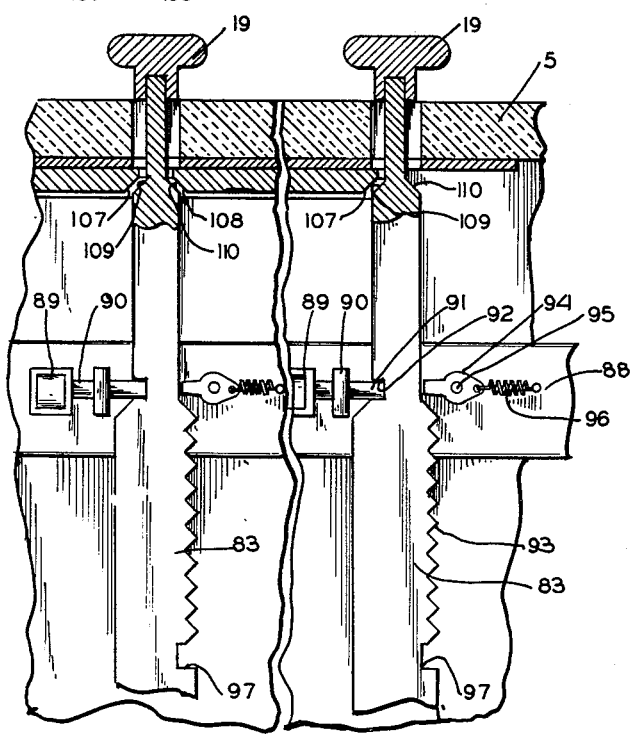
FIG. 8 is a fragmentary sectional view taken along line 8—8 of FIG. 5.

The several actuating bars 83 rest slidably upon a transversely extending horizontal supporting member or channel 88 which carries five identical solenoids 89, each having a retractible armature bar 90 which extends slidably through a stationary guide 91 and projects into a notch 92 formed in the actuating bar 83. The solenoid 89 is of conventional design and need not be described specifically herein, it being merely sufficient to point out that the armature bar 90 is spring biased outwardly when the solenoid 89 is not energized and is retracted inwardly when the solenoid 89 is energized. Thus, when the solenoid 89 is energized the armature bar 90 will be pulled to the left (reference being made to FIG. 8) thereby unlocking the particular actuator bar 83 with which such solenoid 89 is operatively associated. Along its longitudinal side face which is opposite with respect to the position of the solenoids 89, the actuator bars 83 are provided with a series of saw-tooth notches 93 for engagement with a rocking dog 94 which is pivotally mounted upon a pin 95 set into the channel 88. The rocking dog 94 is normally biased into the position shown in FIG. 8 by means of a tension spring 96 and the actuator bar is somewhat thinner in the transverse direction along its forward end so that when the actuator bar 83 is in locked position, as shown in FIG. 8, the rocking dog 94 will fall slightly short of engagement with any portion of the actuator bar 83. However, when the solenoid 89 is energized and the armature bar 90 is retracted, the pull-handle 19 may be manually grasped and pulled outwardly. As this occurs, the wider portion of the actuator bar will move up past the rocking dog 94 and swing the free end thereof forwardly so that it will ride successively in the several notches 93. It will be obvious that once the free end of the rocking dog 94 is engaged, in any one of the notches, it cannot swing backwardly to its original position and, therefore, the actuator bar 83 cannot be pushed back in after having been pulled out for a partial distance of its forward travel. If, however, the actuator bar 83 is pulled all the way out the rocking dog 94 will engage the large rectilinear terminal notch 97 and will then be free to swing back to its initial position. That is to say, the position in which it is perpendicular to the longitudinal axis of the actuator bar 83. Once the rocking dog 94 has returned to this initial position, the actuator bar 83 can be pushed inwardly and the rocking dog 94 will swing backwardly in the opposite direction successively engaging the several notches 93 until the actuator bar 83 has been pushed all the way in to fully retracted position. Again, the rocking dog 94 will prevent retrograde movement of the actuator bar 83 from any intermediate position. In other words, the actuator bar 83 cannot be pushed partially in and then pulled back out again.

Whenever one of the solenoids 89 is energized and its associated actuator bar 83 is unlocked, such actuator bar 83 can be manually pulled out to fully extended position in the manner above described so that the discharge shoe 81 is pulled forward completely away from beneath the food package P supported thereon and such food package P will drop down below the plate 80 in endwise abutting alignment with the pusher-flange 82. Thus, when the pull-handle 19 is pushed inwardly the pusher-flange 82 will propel the food package P toward the rear until it drops down onto the discharge apron 77 and slides therealong into accessible shoes directly behind the transparent closure flap 17 from whence it may be manually removed by the customer.

Rigidly mounted upon the front wall 71 directly above each of the discharge shoes 81 is a normally closed microswitch 98 having a forwardly extending switch plunger 99 which abuts against an upstanding finger 100 rigidly mounted on the discharge shoe 81. When each discharge shoe 81 is in its rearwardmost position, the finger 100 which is associated therewith will engage the switch plunger 99 and hold the switch 98 open. Whenever one of the discharge shoes 81 is pulled forwardly as part of a discharge operation, the finger 100 associated therewith will immediately move away from the switch plunger 99 of the switch 98 which is associated with such discharge shoe 81 and a circuit will be completed through such switch 98.

Rigidly mounted upon the interior face of the front wall 5 are slide channels 101, 101', having horizontal flanges 102, 102', respectively. Slidably seated within the slide channel 101 is a plurality of interlock-bars 103 each having a horizontal flange 104 which slides between the flanges 102, 102'. Each interlock-bar 103 extends across the space between two adjacent pull-handles 19 and has projecting fingers 105, 106, which are in endwise abutment with similar fingers 105, 106, of adjacent interlock-bars 103. The flanges 104 of the interlock-bars 103 have mitered corners 107, 108, as shown in FIG. 8, so as to be cammed longitudinally by inclined camming shoulders 109, 110, on each of the actuator bars 83. Thus, when the customer grasps and pulls one pull-handle 19, the camming shoulders 107, 108, associated therewith will pass by the interlock-bars 103 adjacent thereto and push them longitudinally in to endwise abutment with all the other interlock-bars 103, causing them to shift into locking engagement with all other actuator bars 83. Consequently, a customer can only actuate one pull-handle during any one vending cycle and, therefore, cannot "cheat" the vending machine A.

Operatively mounted in any convenient manner within the lower compartment $c^1$ is a solenoid actuated incremental stepping switch 111, an interlocking relay 112, and a main time-delay switch or so-called master timer 113, and a manually operable thermostat control 114 which is operatively associated with the thermostatic control 68.

Various electrical components are interconnected or wired as shown in the circuit diagram, FIG. 12. It will, of course, be understood that the money switch $m$ will count the coins dropped into the coin-receiving mechanism B and, assuming that the device operates in terms of five-cent increments, will generate a single discrete pulse for each five-cent increment in the total amount of money so deposited. If, for example, thirty cents is deposited in the mechanism B the money switch $m$ will generate six discrete pulses which will, in turn, be transmitted along the lead wire 115 to the stepping solenoid 116 within the stepping switch 111 and will cause the contact arm 117 thereof to move six steps to the sixth contact button 118. The incremental stepping switch 111 is also provided with a homing switch 119 which is operated by a cam 120. The homing switch 119 will close as soon as the arm 117 and the cam 120 move off of zero position upon receiving the first pulse from the money switch $m$. However, as long as the relay 112 is in de-energized position, i.e., the position shown in FIG. 12, the circuit through the closed homing switch 119 will be discontinuous by reason of the fact that the switch 121 in the relay 112 is open. Thus, the reset solenoid 122 will remain de-energized. When, however, any one of the pull-handles 19 is pulled forwardly, the microswitch 98 which is associated with such pull-handle 19 will close energizing the relay 112 and causing it to pull in. This will, for one thing, cause the switch 121 to close completing a circuit through the homing switch 119 to the reset solenoid 122 and thereby will cause the arm 117 of the stepping switch 111 to return to zero position.

It will be noted that the various solenoids 89 are connected to ground through one of the several contact buttons 118. For example, the solenoid 89 which is associated with the storage chute $D^1$ is connected to the fourth or twenty-cent contact button 118. Similarly, the solenoid 89 associated with the storage chute $D^2$ is connected to the fifth or twenty-five-cent contact button 118. The solenoids 89 associated with the storage chutes $D^3$, $D^4$, are both connected to the sixth or thirty-cent contact button 118, and, finally, the solenoid 89 associated with the storage chute $D^5$ is connected to the eighth or forty-cent contact button 118. Thus, when thirty cents is deposited in the coin-receiving and slug-rejecting device B the contact arm 117 will move around to the sixth or thirty-cent contact button 118, as previously pointed out, and both of the solenoids 89, which are connected to such contact button 118 will be energized so that a food package P can be distributed from either of the storage chutes $D^3$, $D^4$. In other words, the food packages in these two storage chutes $D^3$, $D^4$, are priced at thirty cents. However, if the purchaser desires to purchase the particular article in the storage chute $D^3$ and grasps the pull-handle 19 associated with such storage chute $D^3$ incident to pulling it forward and then pushes it back again in a merchandising-vending cycle of movement, the first forward increment of movement of the discharge shoe 81 will cause the microswitch 98 associated therewith to close completing a circuit to the relay 112. This, of course, immediately causes the stepping switch 111 to reset itself as above described. In addition, a normally closed interlock switch 123 which is in series with the money switch $m$ is opened so that the money switch $m$ will become inactive. The relay 112 also contains a normally opened timer-control switch 124 which closes when the relay 112 pulls in and completes a circuit to the master timer 113 which, in turn, completes a circuit to two manually operable timers 125, 126, located upon the front forwardly presented face of the front wall 5 and respectively associated with the two oven compartments $3^3$, $c^4$. The master timer 113 will hold this circuit closed for some selected period of time such as, for example, three minutes. The manually operated timers 125, 126, can be set to any desired time interval up to a maximum limit which is somewhat less than the maximum time limit established by the master timer 113. For example, the timers 125, 126, may have a maximum time interval of two minutes. This one minute tolerance period between the maximum limiting of the master timer 113 and the manually operable timers 125, 126, will allow ample time for manipulation by the customer. The instructions imprinted on the face of the vending machine A will instruct the customer to remove the food package P from the chute 79 and place it in one or the other of the oven compartments $c^3$, $c^4$. The instructions will, furthermore, direct the customer, next in order, to set one or the other of the timer switches 125, 126, to either a full two-minute interval or some shorter interval depending upon the degree of heat desired in the sandwich. If, for example, the customer elects to place the food package P in the oven $c^3$, the timer 116 will be set. Since the vending operation which has been performed by the customer will have closed the circuit to the master timer 113, the tubes 36, 37, will be energized and will remain on for the period of time governed by the timer 125. Moreover, the setting of the timer 125 will depend upon how warm or hot the customer desires to have the food. It should also be noted in this connection that the infra-red tubes 36, 37, 38, 39, are of such wattage as to generate a sufficient amount of heat so as to heat the foods, such as cheese sandwiches, hamburger sandwiches, and the like, within a period of two minutes. If the particular customer desires to have a sandwich which is only warm rather than thoroughly hot, such customer may set the timer for a shorter interval of oven-time.

After three minutes has elapsed the master timer 113 will automatically open the circuit to the timers 125, 126, and the tubes 36, 37, in the oven compartment $c^3$ will go off. It should also be pointed out in this connection, the master timer 113 is of such construction that it will reset itself to a full three-minute time-delay interval every time it is energized. If, for example, it is energized a second time before the time has run out from the previous cycle, it will merely reset itself to its initial position and start running as another three-minute interval. Timers of this type are conventionally available.

The circuitry associated with the refrigeration unit R is entirely conventional and is shown in FIG. 12. It, therefore, need not be described in particular detail.

It should be understood that changes and modifications in the form, construction, arrangement, and combination of the several parts of the vending machines for vending hot food may be made and substituted for those herein shown and described without departing from the nature and principle of my invention.

Having thus described my invention, what I claim and desire to secure by Letters Patent is:

1. A vending machine comprising an outer housing having a dispensing opening, a plurality of vertical storage stacks operatively mounted within the housing and having downwardly presented discharge openings, chute-forming means extending from said stacks to the dispensing opening, slide means operatively located beneath each stack for holding the contents in the stack, an actuator bar operatively associated with said slide means and being provided with a groove along one longitudinal margin thereof, a pull-handle operatively associated with each actuator bar, coin-acceptance means for generating a pulse corresponding to each successive incremental amount of money deposited therein, a stepping switch adapted to receive said pulses and advance to a different contact position for each pulse, a lock having a pin which is normally engaged in the groove of each actuator bar for preventing movement of said slide means, a solenoid operatively associated with each lock for disengaging the pin when the solenoid is energized, means for connecting each solenoid to some one of the contact positions of the stepping switch so that the lock associated with such solenoid will be open when some predetermined amount of money has been deposited in the coin-acceptance means, said actuator bar having a series of saw tooth notches, and pawl means operatively engageable by said saw tooth notches, said actuator bar also having a large rectilinear terminal notch which is engageable by said pawl means and thereby permitting said pull-handle to return to its original position.

2. A vending machine comprising an outer housing having a dispensing opening, a plurality of vertical storage stacks operatively mounted within the housing and having downwardly presented discharge openings, chute-forming means extending from said stacks to the dispensing opening, slide means operatively located beneath each stack for holding the contents in the stack, a pull-handle operatively associated with each slide means, coin-acceptance means for generating a pulse corresponding to each successive incremental amount of money deposited therein, a stepping switch adapted to receive said pulses and advance to a different contact position for each pulse, a lock normally engaged in each slide means for preventing movement thereof, a solenoid operatively associated with each lock for disengaging the lock when the solenoid is energized, means for connecting each solenoid to some one of the contact positions of the stepping switch so that the lock associated with such solenoid will be open when some predetermined amount of money has been deposited in the coin-acceptance means, an actuator bar operatively associated with said pull-handle, said actuator bar having a series of saw tooth notches, and pawl means operatively engageable by said saw tooth notches, said actuator bar also having a large rectilinear terminal notch which is engageable by said pawl means and thereby permitting said pull-handle to return to its original position.

3. A vending machine comprising an outer housing having a dispensing opening, a plurality of vertical storage stacks operatively mounted within the housing and having downwardly presented discharge openings, chute-forming means extending from said stacks to the dispensing opening, slide means operatively located beneath each stack for holding the contents in the stack, a pull-handle operatively associated with each slide means, coin-acceptance means for generating a pulse corresponding to each successive incremental amount of money deposited therein, a stepping switch adapted to receive said pulses and advance to a different contact position for each pulse, a lock normally engaged in each slide means for preventing movement thereof, a solenoid operatively associated with each lock for disengaging the lock when the solenoid is energized, means for connecting each solenoid to some one of the contact positions of the stepping switch so that the lock associated with such solenoid will be open when some predetermined amount of money has been deposited in the coin-acceptance means, a plurality of interlock bars, each of which extends across the space between two adjacent pull-handles, each of said interlock bars having a finger at each of its transverse ends, the finger of one interlock bar being in endwise abutment with a similar finger on an adjacent interlock bar, means operatively associated with each of said interlock bars and said pull-handles for causing said interlock bars to longitudinally shift when one pull-handle is operated and thereby locking all other pull-handles, and means for preventing partial manipulation of the pull-handle.

4. A vending machine comprising an outer housing having a dispensing opening, a plurality of vertical storage stacks operatively mounted within the housing and having downwardly presented discharge openings, chute-forming means extending from said stacks to the dispensing opening, slide means operatively located beneath each stack for holding the contents in the stack, a pull-handle operatively associated with each slide means, coin-acceptance means for generating a pulse corresponding to each successive incremental amount of money deposited therein, a stepping switch adapted to receive said pulses and advance to a different contact position for each pulse, a lock normally engaged in each slide means for preventing movement thereof, a solenoid operatively associated with each lock for disengaging the lock when the solenoid is energized, means for connecting each solenoid to some one of the contact positions of the stepping switch so that the lock associated with such solenoid will be open when some predetermined amount of money has been deposited in the coin-acceptance means, oven means operatively mounted in the vending machine, electric heating means in the oven, and a switch associated with each slide means for rendering the oven means operable when one of the slide means is actuated.

5. A vending machine comprising an outer housing having a dispensing opening, a plurality of vertical storage stacks operatively mounted within the housing and having downwardly presented discharge openings, chute-forming means extending from said stacks to the dispensing opening, slide means operatively located beneath each stack for holding the contents in the stack, a pull-handle operatively associated with each slide means, coin-acceptance means for generating a pulse corresponding to each successive incremental amount of money deposited therein, a stepping switch adapted to receive said pulses and advance to a different contact position for each pulse, a lock normally engaged in each slide means for preventing movement thereof, a solenoid operatively associated with each lock for disengaging the lock when the solenoid is energized, means for connecting each solenoid to some one of the contact positions of the stepping switch so that the lock associated with such solenoid will be open when some predetermined amount of money has been deposited in the coin-acceptance means, means for precluding the operation of more than one handle at a time, oven means operatively mounted in the vending machine, electric heating means in the oven, and a switch associated with each slide means for rendering the oven means operable when one of the slide means is actuated.

6. A vending machine comprising an outer housing having a dispensing opening, a plurality of vertical storage stacks operatively mounted within the housing and having downwardly presented discharge openings, chute-forming means extending from said stacks to the dispensing opening, slide means operatively located beneath each stack for holding the contents in the stack, a pull-handle operatively associated with each slide means, coin-acceptance means for generating a pulse corresponding to each successive incremental amount of money deposited therein, a stepping switch adapted to receive said pulses and advance to a different contact position for each pulse, a lock normally engaged in each slide means for preventing movement thereof, a solenoid operatively associated with each lock for disengaging the lock when the solenoid is energized, means for connecting each solenoid to some one of the contact positions of the stepping switch so that the lock associated with such solenoid will be open when some predetermined amount of money has been deposited in the coin-acceptance means, oven means operatively mounted in the vending machine, electric heating means in the oven, a switch associated with each slide means for rendering the oven means operable when one of the slide means is actuated, first timer means for governing the heating cycle of the oven means, and second timer means operatively connected to said switch for opening and closing said switch during a predetermined time interval and thereby regulating the time in which the oven means is operable.

7. A vending machine comprising an outer housing having a dispensing opening, a plurality of vertical storage stacks operatively mounted within the housing and having downwardly presented discharge openings, chute-forming means extending from said stacks to the dispensing opening, slide means operatively located beneath each stack for holding the contents in the stack, a pull-handle operatively associated with each slide means, coin-acceptance means for generating a pulse corresponding to each successive incremental amount of money deposited therein, a stepping switch adapted to receive said pulses and advance to a different contact position for each pulse, a lock normally engaged in each slide means for preventing movement thereof, a solenoid operatively associated with each lock for disengaging the lock when the solenoid is energized, means for connecting each solenoid to some one of the contact positions of the stepping switch so that the lock associated with such solenoid will be open when some predetermined amount of money has been deposited in the coin-acceptance means, oven means operatively mounted in the vending machine, electric heating means in the oven, a switch associated with each slide means for rendering the oven means operable when one of the slide means is actuated, manually settable timer means for governing the heating cycle of the oven means, and time delay means operable responsive to movement of any one of the slide means for rendering the manually settable timer means operative.

8. A vending machine comprising an outer housing having a dispensing opening, a plurality of vertical storage stacks operatively mounted within the housing and having downwardly presented discharge openings, chute-forming means extending from said stacks to the dispensing opening, slide means operatively located beneath each stack for holding the contents in the stack, a pull-handle operatively associated with each slide means, coin-acceptance means for generating a pulse corresponding to each successive incremental amount of money deposited therein, a stepping switch adapted to receive said pulses and advance to a different contact position for each pulse, a lock normally engaged in each slide means for preventing movement thereof, a solenoid operatively associated with each lock for disengaging the lock when the solenoid is energized, means for connecting each solenoid to some one of the contact positions of the stepping switch so that the lock associated with such solenoid will be open when some predetermined amount of money has been deposited in the coin-acceptance means, a plurality of interlock bars, each of which extends across the space between two adjacent pull-handles, each of said interlock bars having a finger at each of its transverse ends, the fingers of one interlock bar being in endwise abutment with a similar finger on an adjacent interlock bar, camming means operatively associated with each of said interlock bars and said pull-handles for causing said interlock bars to longitudinally shift when one pull-handle is operated and thereby locking all other pull-handles, and means for preventing partial manipulation of the pull-handle.

9. A vending machine comprising an outer housing having a dispensing opening, a plurality of vertical storage stacks operatively mounted within the housing and having downwardly presented discharge openings, chute-forming means extending from said stacks to the dispensing opening, slide means operatively located beneath each stack for holding the contents in the stack, a pull-handle operatively associated with each slide means, coin-acceptance means for generating a pulse corresponding to each successive incremental amount of money deposited therein, a stepping switch adapted to receive said pulses and advance to a different contact position for each pulse, a lock normally engaged in each slide means for preventing movement thereof, a solenoid operatively associated with each lock for disengaging the lock when the solenoid is energized, means for connecting each solenoid to some one of the contact positions of the stepping switch so that the lock associated with such solenoid will be open when some predetermined amount of money has been deposited in the coin-acceptance means, a plurality of interlock bars, each of which extends across the space between two adjacent pull-handles, each of said interlock bars having a finger at each of its transverse ends, the finger of one interlock bar being in endwise abutment with a similar finger on an adjacent interlock bar, each of said slide means having camming surfaces, said interlock bars each having matching camming surfaces, the camming surfaces of said slide means being adapted to engage the matching camming surfaces of its associated interlock bars and thereby longitudinally shift each of the other interlock bars when one pull-handle is operated causing them to lock all other slide means and pull-handles, and means for preventing partial manipulation of the pull-handle.

10. A vending machine comprising an outer housing having a dispensing opening, a plurality of vertical storage stacks operatively mounted within the housing and having downwardly presented discharge openings, chute-forming means extending from said stacks to the dispensing opening, slide means operatively located beneath each stack for holding the contents in the stack, an actuator bar operatively associated with said slide means and being provided with a groove along one longitudinal margin thereof, a pull-handle operatively associated with each actuator bar, coin-acceptance means for generating a pulse corresponding to each successive incremental amount of money deposited therein, a stepping switch adapted to receive said pulses and advance to a different contact position for each pulse, a lock having a pin which is normally engaged in the groove of each actuator bar for preventing movement of said slide means, a solenoid operatively associated with each lock for disengaging the pin when the solenoid is energized, means for connecting each solenoid to some one of the contact positions of the stepping switch so that the lock associated with such solenoid will be open when some predetermined amount of money has been deposited in the coin-acceptance means, said actuator bar having a series of saw tooth notches, pawl means operatively engageable by said saw tooth notches, said actuator bar also having a large rectilinear terminal notch which is engageable by said pawl means and thereby permitting said pull-handle to return to its original position, a plurality of interlock bars, each of which extends across the space between two adjacent pull-handles, each of said interlock bars having a finger at each of its transverse ends, the fingers of one interlock bar being in endwise abutment with a similar finger on an adjacent interlock bar, and camming means operatively associated with each of said interlock bars and said pull-handles for causing said interlock bars to longitudinally shift when one pull-handle is operated and thereby locking all other pull-handles.

References Cited in the file of this patent

UNITED STATES PATENTS

| | | |
|---|---|---|
| 2,635,731 | Dolman | Apr. 21, 1953 |
| 2,794,384 | Sierk et al. | June 4, 1957 |
| 2,853,205 | Boyd | Sept. 23, 1958 |
| 2,901,964 | Johnson | Sept. 1, 1959 |
| 2,923,433 | Gabrielsen et al. | Feb. 2, 1960 |
| 2,950,024 | Adler | Aug. 23, 1960 |
| 3,005,532 | Hines et al. | Oct. 24, 1961 |